④United States Patent

[11] 3,573,492

[72] Inventor Thomas Austin Bridgewater Indianapolis, Ind.
[21] Appl. No. 829,395
[22] Filed June 2, 1969
[45] Patented Apr. 6, 1971
[73] Assignee RCA Corporation

[54] NOISE IMMUNITY CIRCUIT
8 Claims, 1 Drawing Fig.

[52] U.S. Cl. .......................................................... 307/234, 307/246, 307/265, 307/294
[51] Int. Cl. .......................................................... H03k 5/20
[50] Field of Search .......................................... 307/234, 265, 294, 246

[56] References Cited
UNITED STATES PATENTS
3,414,735 12/1968 Harris et al. .................. 307/294X

*Primary Examiner*—Donald D. Forrer
*Assistant Examiner*—John Zazworsky
*Attorney*—Eugene M. Whitacre

ABSTRACT: A remote control system includes a noise immunity circuit providing a short duration pulse output in response to an input signal of a predetermined duration. The circuit includes a capacitor which is initially discharged and thereafter charged through a first charging path. When the capacitor becomes charged to a predetermined level, a multivibrator circuit is triggered and provides a second charging path for the capacitor. An output stage is coupled to the multivibrator to provide an output pulse to remote control circuits when the multivibrator is triggered.

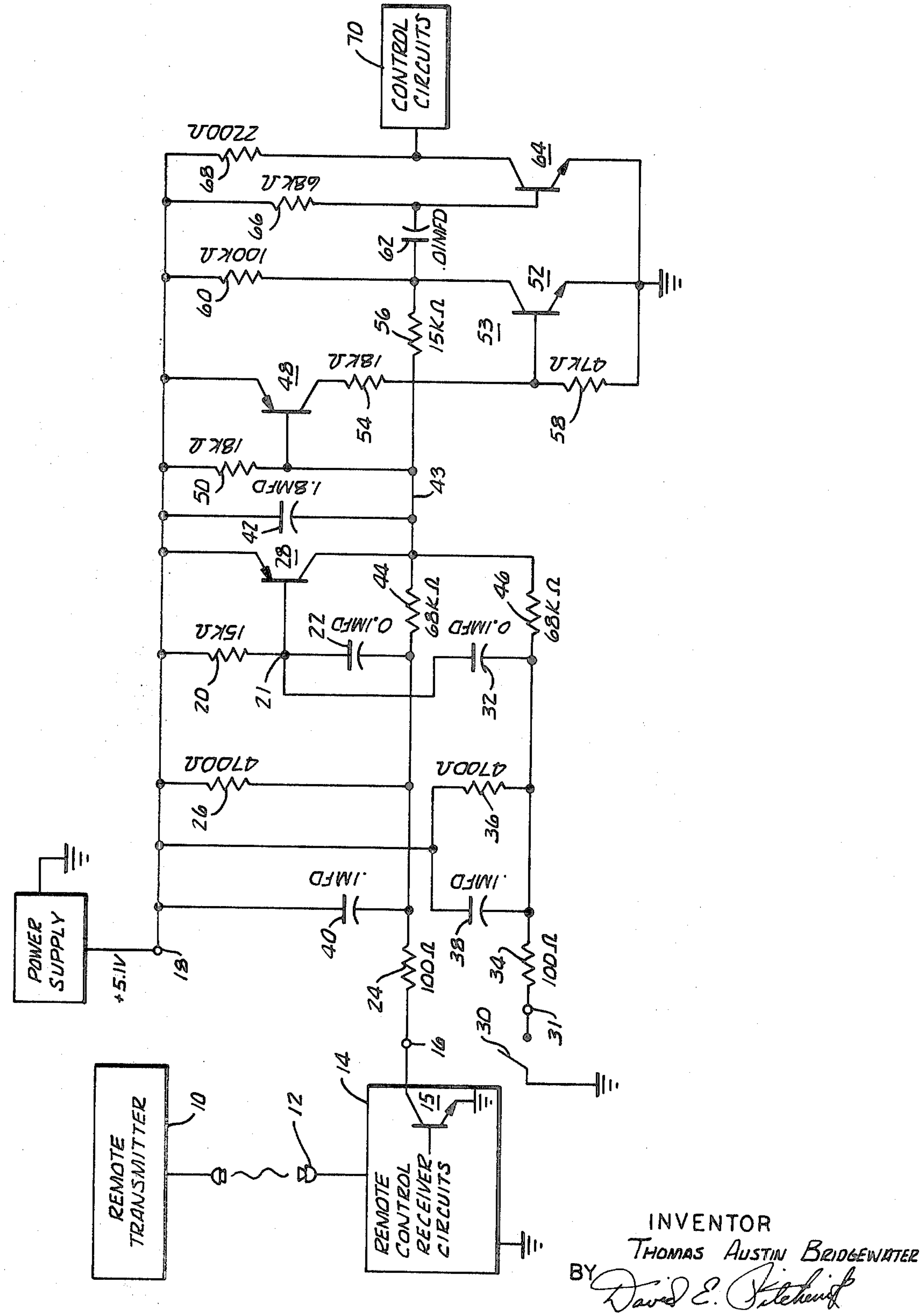
INVENTOR
THOMAS AUSTIN BRIDGEWATER
BY David E. Pitchenik
Attorney

NOISE IMMUNITY CIRCUIT

The present invention relates to remote control systems, and more particularly, to a noise immunity circuit for a remote control system.

Various types of wireless remote control systems have heretofore been proposed wherein a local transmitter is caused to radiate radio or sound controlled signal waves having a predetermined frequency or modulation characteristic for reception by, and control of, remotely located apparatus.

Systems of this type have been commonly used to control the operation of remotely located radio or television receivers by enabling the listener or viewer to adjust the tuning or volume, etc., without moving to the receiver location.

A problem encountered in the design of remote control systems of this type is erroneous actuation of remote circuits when the frequency of spurious radiations from electronic equipment, for systems using radio waves, or random waves, from jingling keys or coins, for systems using sound waves, correspond to the frequency of the control signal. To overcome this problem, prior art remote control receivers have been provided with frequency selective filters and time delays associated with mechanical relays. However, where the control circuits are electronic in nature, no mechanical relays are present. Moreover, where the control circuits are actuated by a short duration pulse, it is particularly susceptible to erroneous actuation, and a noise immunity circuit must be provided to prevent spurious signals from reaching the control circuit. Nevertheless, when the local transmitter is radiating a radio or sound control signal, the noise immunity circuit must provide an output pulse of sufficiently short duration to actuate the control circuits.

A system embodying the present invention includes a circuit for producing output pulses in response to a desired input signal of a predetermined duration which may be accompanied by undesired signals of less duration. A first switch means responsive to the input signal completes a first charging path including a capacitor and a source of operating supply potential. A second switch means coupled to the first switch means is momentarily operative to provide a low impedance path across the capacitor when the first switch means completes the first charging path. A third switch means is coupled to the capacitor and is responsive to a predetermined level of voltage across the capacitor for completing a second charging path including the capacitor and the operating potential supply means. The second charging path is independent of the first charging path and the duration for charging the capacitor to the predetermined level of voltage is substantially equal to the predetermined duration of the desired input signal.

A complete understanding of the present invention may be obtained from the following detailed description of a specific embodiment thereof, when taken in conjunction with the accompanying drawing, in which:

The single FIGURE is a schematic circuit diagram, partly in block form, of a noise immunity circuit for a remote control system embodying the present invention.

Reference is now made to the single FIG. A transmitter 10, which may be of the hand-held variety, transmits acoustic or sound control waves. In the present instance, the transmitter may be similar to the KRK-10A described in RCA Remote Television Service Data 1968 No. T4 published by the RCA Sales Corporation, 600 North Sherman Drive, Indianapolis, Indiana. A transmitter of this type includes a transistor oscillator which is actuated by pressing a button to produce any one of eight different ultrasonic control frequencies as long as the button is depressed. The eight frequencies are in the range of 34 kHz. to 45 kHz.

The control signals are transmitted by a sonic transducer and are detected by a microphone 12 associated with the television remote control receiver circuits 14. The remote control receiver circuit may be similar to the circuits disclosed in a patent application entitled, "Threshold Digital Switch Circuit for Remote Control Systems" Ser. No. 818,222, Filed Apr. 22, 1969, in the name of Lyle Bruce Juroff, and assigned to the Radio Corporation of America. Suffice it to say that the remote control receiver circuit upon reception of a transmitted signal causes the terminal 16 to be electrically connected to a point of reference potential, shown as ground, through the collector-emitter electrode path of a transistor 15. The transistor 15 is the output stage of the remote control receiver circuits 14.

The grounding of the terminal 16 completes a current path from the power supply, connected at the terminal 18, through the base-emitter path of transistor 28, a capacitor 22, a resistor 24, and the collector-emitter path of the transistor 15, to ground. This causes the transistor 28 to conduct until the capacitor 22 becomes charged, the charging time constant being primarily determined by the parameters of the capacitor 22 and the resistor 24. The capacitor 22, when the terminal 16 is not grounded, is normally maintained discharged by the series connected resistors 20 and 26 coupled across the capacitor 22.

Manual operation of the circuit can be had by the closing of a switch 30 connected to a terminal 31. The switch 30 may be located on the front panel of a television chassis for manual actuation by the viewer. Closing of the switch 30 completes a current path from the power supply at terminal 18, through the base-emitter path of transistor 28, the capacitor 32 and the resistor 34 to ground. The closing of switch 30 also causes momentary conduction of the transistor 28. The capacitor 32, when the switch 30 is open, is normally maintained discharged by the resistors 36 and 20. High frequency transients appearing at the input terminals for the circuit are filtered by the resistor 34 and capacitor 38 (for terminal 31) and resistor 24 and capacitor 40 (for terminal 16).

The momentary conduction of the transistor 28 provides a low impedance path across the terminals of capacitor 42, discharging that capacitor. The short circuit also exists between the base and emitter electrodes of transistor 48 causing that transistor to be nonconductive. After the transistor 28 resumes its normally nonconductive state, the capacitor 42 commences to charge in a circuit path including the power supply and the resistors 24 and 44. The capacitor 42 continues to charge while the input terminal (16 or 31) is grounded.

If the terminal 16 is maintained at ground potential for about 26 milliseconds for the parameters shown in the drawing, the voltage across the capacitor 42, which is directly between the base and emitter electrodes of transistor 48, builds up sufficiently to drive transistor 48 into conduction.

The transistors 48 and 52 form a multivibrator 53. The collector electrode of the transistor 48 is connected to the base electrode of the transistor 52 by a resistor 54 and the collector electrode of the transistor 52 is connected to the base electrode of the transistor 48 by a resistor 56. The collector-emitter current path for the transistors 48 and 52 are completed by the resistors 58 and 60, respectively.

Once the transistor 48 becomes conductive, a voltage is applied to the base electrode of the transistor 52 causing it to become conductive, and the conducting transistor 52 provides an additional charging path for the capacitor 42 through the resistor 56 and the collector-emitter current path of the transistor 52 to ground. Consequently, the charging rate of the capacitor becomes more rapid as the transistor 52 begins to conduct with an increasing rate of voltage change at the junction 43, "snapping" the transistors 48 and 52 into conduction. The decreasing voltage at the collector electrode of the transistor 52 is differentiated by the capacitor 62-resistor 66 circuit and applied to the base electrode of a normally conducting transistor 64 by biasing it momentarily out of conduction. Bias for the transistor 64 is obtained via the resistors 66 and 68 coupled between the transistor and the power supply terminal 18. The positive pulse of voltage developed at the collector electrode of the transistor 64 is applied as an input to the control circuits 70 causing then to be actuated.

After the grounding of one of the terminals 16 and 31 is removed, the multivibrator 53 will remain in its conducting state; that is, the condition with both the transistors 48 and 52 biased into conduction. The capacitor 42 will remain charged. When either of the terminals 16 or 31 is again grounded, the momentary conduction of the transistor 28 will reset the multivibrator 53 so that both transistors 48 and 52 will be nonconductive. The resultant positive pulse of voltage at the collector electrode of the transistor 52 is coupled to the base electrode of the transistor 64 via the capacitor 62-resistor 66 circuit. However, since the transistor 64 is already conducting the positive pulse does not affect collector electrode voltage of the transistor and, hence, does not affect the input to the control circuits 70.

I claim:

1. An electrical circuit for producing output pulses in response to desired input signals of predetermined duration which may be accompanied by undesired signals of less duration than said predetermined duration;

a capacitor;

operating potential supply means;

first switch means responsive to said input signals for completing a first charging circuit path including said capacitor and said operating potential supply means;

second switch means coupled to said first switch means, said second switch means being momentarily operative to provide a low impedance path across said capacitor when said first switching means completes said charging circuit path; and third switch means coupled to said capacitor and responsive to a predetermined level of voltage across said capacitor for completing a second charging current path including said capacitor and said operating potential supply means which is independent of said first charging circuit path, the time duration for charging said capacitor to said predetermined level of voltage being substantially equal to said predetermined duration.

2. An electric circuit as defined in claim 1 wherein said first switch means includes a transistor having its collector-emitter current path connected in said first charging circuit path.

3. An electric circuit as defined in claim 2 including a fourth mechanically actuated switch means connected for completing a third charging path including said capacitor and said operating potential supply means.

4. An electric circuit as defined in claim 1 wherein said second switch means is a transistor having its collector-emitter electrode current path coupled across said capacitor.

5. An electric circuit as defined in claim 4 wherein said third switch means includes a multivibrator.

6. An electric circuit as defined in claim 5 including means coupled to said third switch means for providing a pulse output after said capacitor charges to said predetermined level of voltage.

7. An electric circuit as defined in claim 1 wherein said third switch means includes a multivibrator, and means coupled to said third switch means for providing a pulse output after said capacitor charges to said predetermined level of voltage.

8. An electric circuit as defined in claim 7 wherein said first switch means includes a transistor having its collector-emitter current path connected in said first charging circuit path, and a fourth mechanically actuated switch means connected for completing a third charging path including said capacitor and said operating potential supply means.

UNITED STATES PATENT OFFICE
CERTIFICATE OF CORRECTION

Patent No. 3,573,492 Dated April 6, 1971

Inventor(s) Thomas Austin Bridgewater

It is certified that error appears in the above-identified patent and that said Letters Patent are hereby corrected as shown below:

In Column 2, line 68, delete "by"; line 73, "then" should read -- them --.

Signed and sealed this 13th day of July 1971.

(SEAL)
Attest:

EDWARD M.FLETCHER,JR.
Attesting Officer

WILLIAM E. SCHUYLER, J
Commissioner of Patent